United States Patent
Hannington

(10) Patent No.: US 8,252,407 B2
(45) Date of Patent: Aug. 28, 2012

(54) ADHESIVE ARTICLE HAVING IMPROVED APPLICATION PROPERTIES

(75) Inventor: Michael E. Hannington, Madison, OH (US)

(73) Assignee: Avery Dennison Corporation, Pasadena, CA (US)

( * ) Notice: Subject to any disclaimer, the term of this patent is extended or adjusted under 35 U.S.C. 154(b) by 568 days.

(21) Appl. No.: 11/577,422

(22) PCT Filed: Dec. 14, 2005

(86) PCT No.: PCT/US2005/045263
§ 371 (c)(1),
(2), (4) Date: Apr. 18, 2007

(87) PCT Pub. No.: WO2006/076116
PCT Pub. Date: Jul. 20, 2006

(65) Prior Publication Data
US 2009/0053449 A1   Feb. 26, 2009

Related U.S. Application Data

(60) Provisional application No. 60/643,297, filed on Jan. 12, 2005.

(51) Int. Cl.
*B32B 33/00* (2006.01)
*B32B 3/30* (2006.01)

(52) U.S. Cl. ...... 428/166; 428/40.1; 428/41.8; 428/161; 428/163; 428/167; 428/168; 428/179; 428/180; 428/182; 428/183; 428/184; 428/185; 428/186; 428/188; 428/192; 428/304.4; 428/332; 428/334; 428/337; 428/340; 428/341; 428/343; 428/542.6; 156/87

(58) Field of Classification Search .......... 428/163, 428/161; 156/87
See application file for complete search history.

(56) References Cited

U.S. PATENT DOCUMENTS

| | | | |
|---|---|---|---|
| 2,191,704 A | 2/1940 | Bennett | |
| 3,150,031 A * | 9/1964 | Powell | 428/142 |
| 3,301,741 A | 1/1967 | Henrickson et al. | |
| 3,331,729 A | 7/1967 | Danielson et al. | |
| 3,413,168 A | 11/1968 | Danielson et al. | |

(Continued)

FOREIGN PATENT DOCUMENTS

DE   3417746   5/1984

(Continued)

OTHER PUBLICATIONS

Process Sensors Corp., Pressure Sensitive Adhesives, 2005 (no month).*

(Continued)

*Primary Examiner* — David Sample
*Assistant Examiner* — Jeff Vonch
(74) *Attorney, Agent, or Firm* — Avery Dennison Corporation

(57) ABSTRACT

An adhesive article and a method of making the adhesive article are described. The adhesive article includes a facestock film having a first surface, a second surface and end edges wherein the second surface has a plurality of recesses formed therein that provide a path for fluid egress to at least one end edge; and a continuous layer of adhesive adhered to the second surface of the facestock film. The adhesive layer can compress, collapse or flex into the recesses of the embossed surface in response to a force to create a path for fluid egress.

16 Claims, 3 Drawing Sheets

U.S. PATENT DOCUMENTS

| | | | |
|---|---|---|---|
| 3,457,919 A * | 7/1969 | Harbard | 602/55 |
| 3,554,835 A | 1/1971 | Morgan | |
| 3,565,750 A | 2/1971 | Evans | |
| 3,802,947 A | 4/1974 | McQuade, Jr. | |
| 4,289,821 A | 9/1981 | Gray, III et al. | |
| 4,306,928 A | 12/1981 | Okui | |
| 4,322,450 A | 3/1982 | Gray, III et al. | |
| 4,397,905 A * | 8/1983 | Dettmer et al. | 428/180 |
| 4,425,176 A | 1/1984 | Shibano et al. | |
| 4,427,732 A | 1/1984 | Gray, III et al. | |
| 4,556,595 A | 12/1985 | Ochi | |
| 4,576,597 A | 3/1986 | Hlaban | |
| 4,582,534 A | 4/1986 | Torobin | |
| 4,636,408 A | 1/1987 | Anthony et al. | |
| 4,713,273 A | 12/1987 | Freedman | |
| 4,721,638 A | 1/1988 | Matsuguchi et al. | |
| 4,761,320 A | 8/1988 | Coburn, Jr. | |
| 4,771,891 A | 9/1988 | Sorensen et al. | |
| 4,889,234 A | 12/1989 | Sorensen et al. | |
| 4,971,854 A | 11/1990 | Hinishi et al. | |
| 5,008,139 A | 4/1991 | Ochi et al. | |
| 5,112,890 A | 5/1992 | Behrens et al. | |
| 5,141,790 A | 8/1992 | Calhoun et al. | |
| 5,162,390 A | 11/1992 | Tilley et al. | |
| 5,180,635 A | 1/1993 | Plamthottam et al. | |
| 5,194,299 A | 3/1993 | Fry | |
| 5,268,228 A | 12/1993 | Orr | |
| 5,273,805 A | 12/1993 | Calhoun et al. | |
| 5,296,277 A | 3/1994 | Wilson et al. | |
| 5,344,681 A | 9/1994 | Calhoun et al. | |
| 5,344,693 A | 9/1994 | Sanders | |
| 5,362,516 A | 11/1994 | Wilson et al. | |
| 5,369,140 A | 11/1994 | Valet et al. | |
| 5,449,540 A | 9/1995 | Calhoun et al. | |
| 5,462,765 A | 10/1995 | Calhoun et al. | |
| 5,487,929 A | 1/1996 | Rusincovitch, Jr. et al. | |
| 5,559,163 A | 9/1996 | Dawson et al. | |
| 5,585,178 A | 12/1996 | Calhoun et al. | |
| 5,589,246 A | 12/1996 | Calhoun et al. | |
| 5,591,290 A | 1/1997 | Walter et al. | |
| 5,650,215 A | 7/1997 | Mazurek et al. | |
| 5,676,787 A | 10/1997 | Rusincovitch et al. | |
| 5,731,073 A | 3/1998 | Knott et al. | |
| 5,795,636 A | 8/1998 | Keller et al. | |
| 5,853,862 A | 12/1998 | Murai et al. | |
| 5,866,220 A | 2/1999 | Rusincovitch et al. | |
| 5,897,930 A | 4/1999 | Calhoun et al. | |
| 5,906,883 A | 5/1999 | Blanc-Brude | |
| 5,915,731 A | 6/1999 | Jackson | |
| 6,001,471 A | 12/1999 | Bries et al. | |
| 6,024,824 A | 2/2000 | Krech | |
| 6,083,616 A * | 7/2000 | Dressler | 428/323 |
| 6,123,890 A | 9/2000 | Mazurek et al. | |
| 6,136,371 A * | 10/2000 | Fidan et al. | 427/208.4 |
| 6,197,397 B1 | 3/2001 | Sher et al. | |
| 6,217,981 B1 * | 4/2001 | Kanno et al. | 428/147 |
| 6,372,341 B1 | 4/2002 | Jung et al. | |
| 6,524,675 B1 | 2/2003 | Mikami et al. | |
| 6,565,697 B1 | 5/2003 | Maercklein | |
| 6,566,024 B1 * | 5/2003 | Bourdelais et al. | 430/11 |
| 6,630,049 B2 * | 10/2003 | Hannington et al. | 156/289 |
| 6,638,602 B2 * | 10/2003 | Itada et al. | 428/172 |
| 6,656,567 B1 * | 12/2003 | Abe et al. | 428/141 |
| 7,060,351 B2 | 6/2006 | Hannington | |
| 2001/0052384 A1 | 12/2001 | Hannington | |
| 2003/0017291 A1 * | 1/2003 | Fleming et al. | 428/40.1 |
| 2003/0039824 A1 * | 2/2003 | Aalbers | 428/343 |
| 2003/0190458 A1 * | 10/2003 | Spiewak et al. | 428/156 |
| 2004/0213993 A1 | 10/2004 | Hannington | |
| 2005/0039847 A1 | 2/2005 | Hannington et al. | |
| 2005/0088014 A1 * | 4/2005 | Woodson et al. | 296/193.07 |
| 2007/0218269 A1 * | 9/2007 | Kato et al. | 428/304.4 |
| 2010/0092730 A1 * | 4/2010 | Tomino et al. | 428/161 |

FOREIGN PATENT DOCUMENTS

| | | |
|---|---|---|
| EP | 0279579 | 8/1988 |
| EP | 0429269 | 5/1991 |
| EP | 0479223 | 4/1992 |
| EP | 0491099 | 6/1992 |
| EP | 0611055 | 8/1994 |
| EP | 1126002 | 8/2001 |
| GB | 1511060 | 5/1978 |
| GB | 1511060 A * | 5/1978 |
| GB | 1541311 | 2/1979 |
| JP | 53149259 | 12/1978 |
| JP | 5953787 | 3/1984 |
| JP | 59078285 | 5/1984 |
| JP | 61254334 | 11/1986 |
| JP | 03231981 | 10/1991 |
| JP | 05084825 | 4/1993 |
| JP | 5271629 | 5/1993 |
| JP | 06212131 | 8/1994 |
| JP | 09157612 | 6/1997 |
| WO | 9829516 | 7/1998 |
| WO | 9915600 | 4/1999 |
| WO | 9935201 | 7/1999 |
| WO | 0069985 | 11/2000 |
| WO | WO 2005035681 A1 * | 4/2005 |

OTHER PUBLICATIONS

Webpage for carbon atom: http://hyperphysics.phy-astr.gsu.edu/hbase/pertab/c.html#c1; Date: Sep. 30, 2004.

Concise Encyclopedia of Polymer Science and Engineering, pp. 902-903. Date and Publisher: 1990 by John Wiley & Sons, Inc.

PCT/US01/12958; PCT International Search Report mailed Sep. 4, 2001.

PCT/US01/12999; PCT International Search Report mailed Jul. 31, 2001.

PCT/US2005/045263; PCT International Search Report mailed Apr. 13, 2006.

Abstract for JP 05084825.

Machine translation for JP 05084825.

* cited by examiner

ADHESIVE ARTICLE HAVING IMPROVED APPLICATION PROPERTIES

This application is a national phase of International Application No. PCT/US2005/045263 filed Dec. 14, 2005 and published in the English language, and claims priority to U.S. Ser. No. 60/643,297 filed Jan. 12, 2005.

FIELD OF INVENTION

The present invention relates generally to an adhesive article and a method of producing the adhesive article. The adhesive articles may be used for graphic images having improved application properties, including improved fluid egress, and optionally repositionability and/or slideability.

BACKGROUND

Pressure sensitive adhesives (PSA) are convenient and often used for tapes and labels, and for mounting adhesive articles containing graphic images to a substrate such as a wall or vehicle. The popularity of pressure sensitive adhesives can be attributed to the strong adhesive bonds that are formed quickly, and their general ease-of-use. Unfortunately, the applicator of pressure sensitive adhesive articles must be careful to minimize or eliminate the trapping of air or liquid between the adhesive surface of the adhesive article and the substrate to which the article is applied. It is desirable to avoid the formation of visible bubbles or wrinkles in the adhesive article. The initial tenacity of the pressure sensitive adhesive requires careful positioning at the onset of an application. That is, the applicator typically gets a single opportunity to correctly position the film, label or tape before the article is firmly adhered to the substrate. This can be problematic for the applicator, and the problem is magnified when the adhesive article is large or the substrate to which the article is applied is not particularly flat or easily accessible.

It is desirable that the adhesive article provides air egress, i.e., the ability of the adhesive article to provide a route for air or liquid trapped between the adhesive article and the underlying substrate to be removed. In addition to the size of the adhesive article affecting ease of application, the application conditions can also impact the ease of application. For example, inclement weather can inhibit the use of pressure sensitive adhesive articles. Even a light rain can preclude outdoor application as the rain may form a barrier between the adhesive article and the substrate surface.

Repositionability and slideability are the abilities of an article having a pressure sensitive adhesive to be contacted or temporarily mounted to a substrate surface, moved into a proper and desirable position, and then secured into place. It is advantageous to have improved repositionability and slideability in many applications involving pressure sensitive adhesives.

It would be desirable to have an adhesive article having improved properties, including air egress, and optionally, repositionability, and/or slideability and a method for making the same.

SUMMARY

The present invention provides an adhesive article comprising a facestock film having a first surface, a second surface and end edges, and a continuous layer of adhesive having a first surface and a second surface, wherein the first surface of the adhesive layer is adhered to the second surface of the facestock film, and wherein the second surface of the facestock film has a plurality of recesses that are free of adhesive and that provide a path for fluid egress.

The adhesive article may further comprise a release liner releasably adhered to the second surface of the adhesive layer. The release surface of the release liner may include non-adhesive material forms adhered thereto or embedded therein. The release liner may have a patterned or textured release surface that imparts a complementary pattern or texture to the surface of the adhesive layer adhered thereto. The non-adhesive material forms, pattern and/or texture of the release surface may provide additional advantageous application properties, including at least one of fluid egress, slideability and repositionability to the adhesive article.

The recesses of the facestock film can be formed using a molding, embossing, imprinting or impressing process. The recesses can be formed integrally with the facestock during its original manufacture or formed in a post processing operation. An example of a post processing operation is an imprinting method wherein protrusions on the second surface of the facestock are built up, creating recesses delimited by the imprinted protrusions.

The recesses can be macroscopic, e.g., their shapes are discernable to the unaided human eye, or microscopic, e.g., their shapes are not discernable to the unaided human eye, or can comprise a combination of macroscopic and microscopic features.

Also in accordance with the present invention, an adhesive article can be produced by contacting the adhesive layer first surface to the facestock second surface having the recess or a plurality of recesses formed therein. The adhesive layer is supported by the facestock and can span the cavity defined by the recess or recesses. This defined cavity can accept the adhesive layer being compressed, collapsed and/or flexed therein in response to a force. A complementary space is created by the compression, collapse and or flexing at the interface between the adhesive layer and the substrate to which the adhesive article is applied. The complementary space is configured to, for example, contain or exhaust an air or liquid bubble.

Sufficient force to compress, collapse or flex the adhesive layer can be supplied by, for example, an air bubble trapped between the second surface of the adhesive layer and the surface of a substrate to which the adhesive article is being applied. The action by the bubble modifies the contact area or interface between the adhesive layer second surface and the substrate surface, and can allow for improved slideability and repositionability. By brushing or sweeping the first surface of the facestock, the trapped bubble can be moved along and through the complementary space to an egress point, such as a peripheral (end) edge of the adhesive article. If the bubble is small enough, the bubble can be contained within the complementary space formed. The adhesive layer can then be more properly adhered to the substrate after the bubble has been removed.

DESCRIPTION OF THE EMBODIMENTS

The present invention provides generally an adhesive article and a method of making the adhesive article. Specifically, the present invention provides an adhesive article having improved application performance with regard to fluid egress during application of the adhesive article to a substrate. The adhesive article may optionally also have improved application performance with regard to repositionability and slideability. An adhesive article according to the present invention is suitable for use in varied and diverse applications, for example, tapes, labels, industrial graphics applications, decorative wall coverings, mounting adhesives for diverse applications such as abrasives and flexographic plates, and specialty materials for signage, such as retroreflective materials. The attributes provided by the present invention can also be an integral part of the diverse adhesive articles described above.

The adhesive articles comprise a facestock and a continuous adhesive layer adhered thereto. The adhesive article may further comprise a release liner releasably adhered to the adhesive layer.

Figure 1:
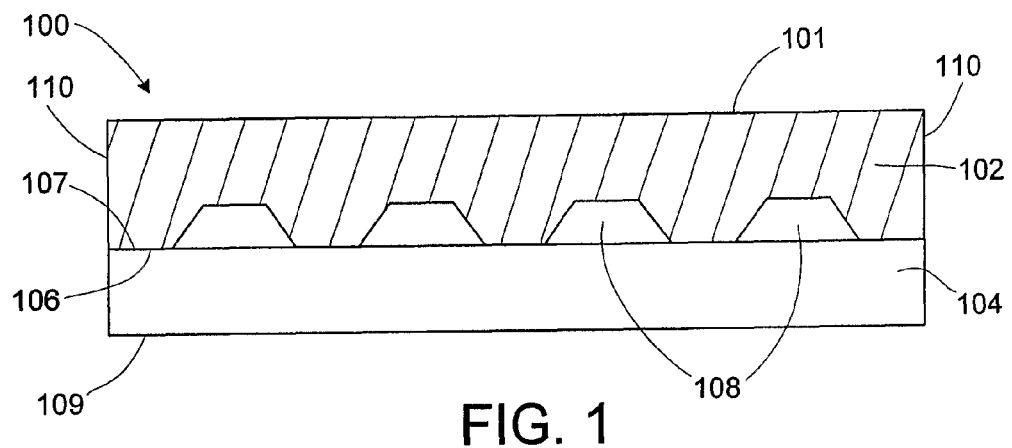
FIG. 1 is a cross-sectional view of an adhesive article comprising a first embodiment in accordance with the invention.
Figure 2:
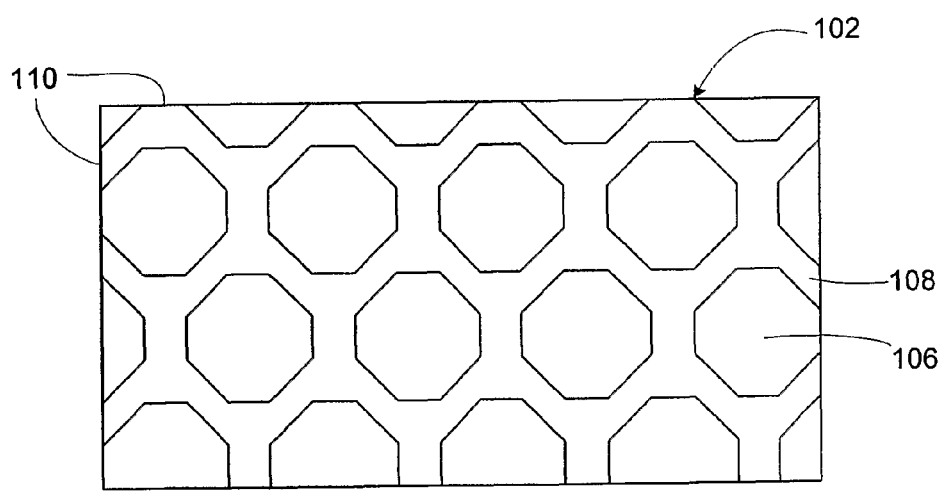
FIG. 2 is a top view of one embodiment of the present invention in which the recesses form a pattern.

Referring to FIG. 1, an adhesive article 100 is described according to a first embodiment of the present invention which includes a facestock film 102 having a first surface 101 and a second surface 106 having a plurality of recesses 108. Adhesive layer 104 has a first surface 107 and a second surface 109, and the first surface of the adhesive layer 104 is adhered to the second surface 106 of the facestock film 102, with the adhesive layer bridging the recesses. The recesses 108 form a path to the end edges of facestock film 102. In one embodiment, the recesses form a pattern, and the pattern of recesses may comprise random shapes or lines. In addition to random patterns, the pattern may comprise an ordered pattern of recesses that may form a weave pattern, a waffle pattern, diagonal straight and curved lines, tiled geometric figures such as a checkerboard of hexagons, rectangles, or triangles, or of lines in a crosshatch pattern. Combinations of random and non-random patterns may be used, such as a grid of intersecting lines having random or patterned dots disposed throughout. In one embodiment illustrated in FIG. 2, the recesses 108 comprise a repeating pattern of shapes in which a path is formed to end edges 110 of the facestock film 102.

Figure 3:
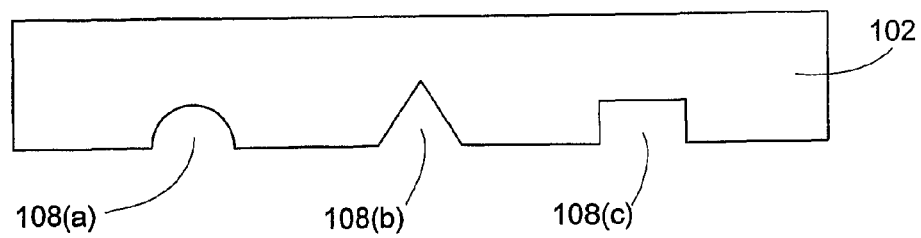
FIG. 3 is a cross-sectional view of various shapes of the recesses.

The cross-sectional area of the recesses 108 may be pyramidal, hemispherical, triangular, square, rectangular and any other suitable shape. FIG. 3 illustrates alternative cross-sectional areas 108(*a*), 108(*b*) and 108(*c*) of the recesses 108. The recesses may all be the same or may comprise different shapes used in combination.

Figure 4:
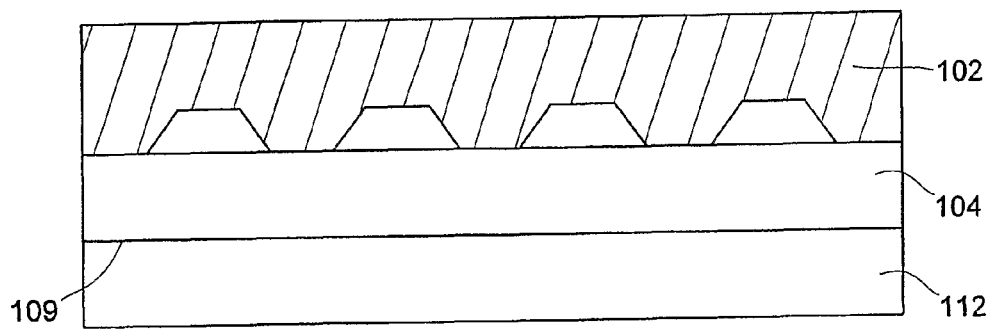
FIG. 4 is a cross-sectional view of an adhesive article of the invention including a release liner.

As illustrated in FIG. 4, the adhesive article may have a release liner 112 releasably adhered to the lower surface 109 of the adhesive layer 104. During application of the adhesive article to a substrate, any release liner present is removed to expose the lower surface 109 of the adhesive layer 104.

Figure 5:
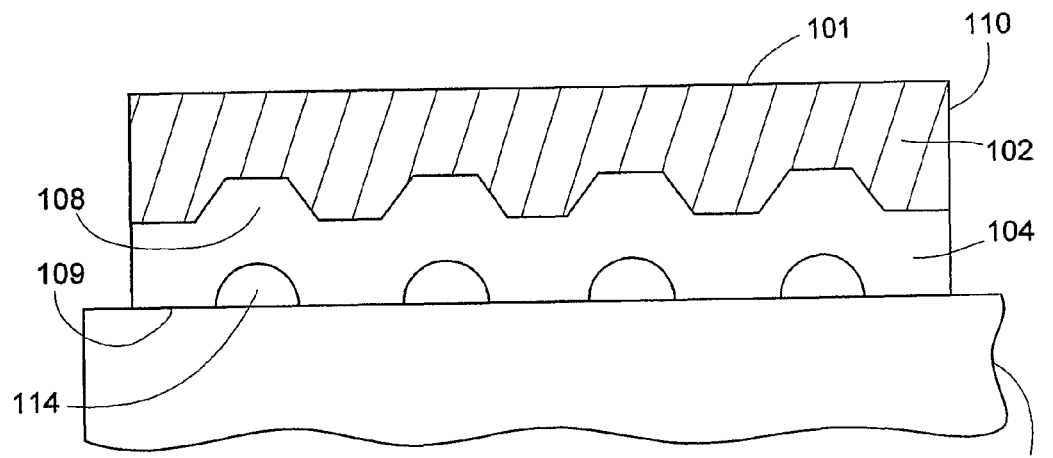
FIG. 5 is a cross-sectional view of an adhesive article of the present invention adhered to a substrate.

FIG. 5 shows the adhesive layer lower surface 109 contacted to a substrate 116. The application of the adhesive article 100 to the substrate 116 may trap, for example, air between the lower surface of the adhesive layer 109 and the surface of the substrate 116. The trapped air forms a bubble 114 that applies a counter force sufficient to flex or collapse the adhesive layer 104 into the area where the adhesive layer 104 spans the recess 108. The counter force causes the adhesive layer 104 to flex or collapse into the recess 108 and to form a complementary space in which the bubble 114 is disposed.

The bubble 114 may form as the natural result of laying the adhesive article 100 onto the substrate 116. The bubble 114 can be formed of a fluid, i.e., a gas or a liquid, but in either case, exhaustion of the bubble by a route of egress from beneath the adhesive article 100 is desirable. Brushing or sweeping the upper surface of facestock film 102 will push the bubble 114 along the complementary path to an egress point, such as a peripheral or end edge 110 of the adhesive article 100, and further out from between the lower surface of adhesive layer 109 and the surface of the substrate 116. As the bubble 114 passes through the complementary path, the adhesive layer 104 is no longer subjected to the counter force created by the presence of the bubble 114. As the counter force is removed, the adhesive layer 104 may substantially resume its previous shape and can contact the substrate surface or the complementary path may remain. The adhesive article 100 is disposed such that it is entirely, or nearly flat against the substrate surface.

The facestocks useful in the articles of the invention may comprise monolayer or multilayer films. The layers of the multilayer films may be comprised of the same or different polymers. The monolayer film facestocks in one embodiment may be extruded, and multilayer films may be coextruded or laminated. The facestocks may have a thickness in the range of from about 0.5 mil to about 100 mils or from about 1 to about 10 mils.

Suitable facestock material includes those materials that are useful for decorative or graphic image applications. Examples of useful facestock materials include polyolefins (linear or branched), polyamides, polystyrenes, nylon, polyesters, polyester copolymers, polyurethanes, polyacrylates, polysulfones, polyvinylchloride, styrene-maleic anhydride copolymers, styrene-acrylonitrile copolymers, ionomers based on sodium or zinc salts of ethylene methacrylic acid, polymethyl methacrylates, cellulosics, fluoroplastics, polycarbonates, polyacrylonitriles, polycyanurates, ethylene-vinyl acetate copolymers, and combinations thereof. The polyacrylates include acrylates such as those derived from ethylene methacrylic acid, ethylene methyl acrylate, ethylene acrylic acid and ethylene ethyl acrylate.

The olefin polymers and copolymers may be formed from olefinic monomers having, for example, from about 2 to about 12 carbon atoms, and in one embodiment having from about 2 to about 8 carbon atoms. These olefinic monomers include alpha-olefins having from about 2 to about 4 carbon atoms per molecule. Particularly suited polymers of alpha-olefins include polyethylene (as described hereinabove), polypropylene, poly-1-butene, and the like. An exemplary olefin copolymer is a copolymer of ethylene and 1-butene, which has an amount of the 1-butene comonomer present in a range of from about 1 weight percent to about 10 weight percent incorporated into the copolymer molecule. Particularly useful polyethylenes include those that have differing densities in the low, medium and high-density ranges. Generally, the low density range is from about 0.910 g/cm$^3$ to about 0.925 g/cm$^3$; the medium density range is from about 0.925 g/cm$^3$ to about 0.940 g/cm$^3$; and the high density range is from about 0.94 g/cm$^3$ to about 0.965 g/cm$^3$. Films prepared from blends of copolymers or blends of copolymers with homopolymers may also be useful. Some suitable facestock raw materials are commercially available from, for example, BP Chemicals P.L.C. (Houston, Tex.).

In one embodiment, the facestock comprises an extruded monolayer polyethylene film having a thickness in the range of from about 0.5 mils (12.5 microns) to about 10 mils (254 microns), or in the range of from about 1 mil (25 microns) to about 5 mils (127 microns).

In one embodiment, the facestocks may include one or more migratory and/or non-migratory additives. Useful migratory additives include plasticizers and antioxidants. The plasticizer may be a high-boiling solvent or softening agent, which is liquid at room temperature. The plasticizer may be an ester made from an anhydride or acid and a suitable alcohol having from about 6 to about 13 carbon atoms. Other suitable plasticizers include adipate, phosphate, benzoate or phthalate esters, polyalkylene oxides, sulfonamides, and the like. The plasticizers may include DOA plasticizer (dioctyl adipate), TEG-EH plasticizer (triethyleneglycol di-2-ethylhexanoate), TOTM plasticizer (trioctyl trimellitate), triacetin plasticizer (glyceryl triacetate), TXIB plasticizer (2,2,4-trimethyl-1,3-pentanediol diisobutyrate), DEP plasticizer (diethyl phthalate), DOTP plasticizer (dioctyl terephthalate), DMP plasticizer (dimethyl phthalate), DOP plasticizer (dioctyl phthalate), DBP plasticizer (dibutyl phthalate), polyethylene oxide, toluene sulfonamide, and dipropylene glycol benzoate.

The antioxidant may provide radical trapping activity and can be selected with reference to at least some of the following considerations: the compatibility with the polymer, the effective stability of the antioxidant at the processing temperatures, whether the antioxidant will cause undesirable coloring, and the likelihood the antioxidant will not interact with other additives. Useful antioxidants may include tert-butylhydroquinone, propyl gallate, sodium nitrate, sodium nitrite, butylated hydroxytoluene (BHT), butylated hydroxyanisole (BHA), and analogs, derivatives and combinations of two or more thereof. Suitable additives are commercially available from such suppliers as Ciba Specialty Chemicals, Inc. (Tarrytown, N.Y.) and Ferro Corp. (Independence, Ohio).

As noted above, the second surface of the facestock has a plurality of recesses 108 formed therein that are free of adhesive. The recesses may contain a compressible gas such as air, and/or may be at least partially filled with a compressible foam.

The recesses 108 which extend into the facestock film can be formed, for example, by molding, embossing, imprinting, impressing or casting. In one embodiment, the recesses form a pattern, and in another embodiment, an interconnected pattern. Upon application of the adhesive article to a substrate, the adhesive collapses or flexes into the interconnected pattern, leaving a complementary pattern at the interface of the adhesive and the substrate, allowing for air egress. The interconnected pattern provides a path to the end edges of the adhesive article for any trapped air (or liquid) to escape.

In one embodiment, the recesses form a pattern that is not interconnected. Upon application of the adhesive article to the substrate, the adhesive collapses into the pattern of recesses leaving a complementary pattern at the interface of the adhesive and the substrate, thus modifying the initial contact area of the adhesive article.

The pattern of recesses may comprise lines, grooves, channels, circles, semi-circles, polygons, random shapes and combinations of two or more thereof. In one embodiment, the ability of the adhesive to flex, compress or collapse into the pattern of recesses in response to a force applied to the adhesive article is influenced and/or controlled by factors including the resilience, elasticity, cohesiveness, thickness and hardness of the adhesive. In another embodiment, the configuration of the recesses, i.e., depth, width, sidewall angle(s) of the recesses, and the resilience, elasticity, surface energy, and/or hardness of the facestock influence the ability of the adhesive layer to flex, compress or collapse into the recesses.

Additional methods of forming recesses in the second surface of the facestock in accordance with the present invention include removal of facestock material. The facestock material can be removed by, for example, scoring, etching, scratching, ablating, or abrading the facestock second surface. If a texture is desired on the facestock second surface, the texture may be a random pattern, such as a matte finish. This texture may be imparted to the facestock second surface using a textured finish roller, such as a matte finish roller. The surface texture may be in addition to the recesses formed in the facestock surface.

In another embodiment, liquid material can be printed or applied directly onto the second surface of the facestock and hardened or cured so that the material builds up to form a recessed area or areas in the desired pattern. The recessed areas and adjacent flat or raised areas are not integrally formed with the facestock, but rather are added by overlaying and adhering after the facestock film is formed. In one embodiment, the raised areas can be formed of an ultraviolet (UV) curable polymer composition, such as a UV curable acrylic or polyurethane composition. The polymer composition can be applied by, for example, screen printing, roller coat printing, flexo printing, gravure printing, brushing, spraying, dipping or coating. After application of the polymer composition, the polymer composition may be cured by irradiation in a UV exposure apparatus. UV light sources such as low-pressure mercury lamps, high-pressure mercury lamps, xenon lamps, arc lamps and gallium lamps may be useful. The polymer composition can be further treated, if desired, by heating after the irradiation. Alternatively, the polymer composition can be cured by heat initially, or by an equivalent method.

In one embodiment, the recesses of the facestock surface defined a plurality of intersecting lines that form diamond-shaped channels. In one embodiment, at least about 50 percent of the lines of the pattern may extend to a peripheral edge or to an aperture in the facestock film to provide acceptable air egress. Lines, dots or a combination thereof, which can differ in size from each other, may have an average depth in a range of from about 0.5 mil (12.5 microns) to about 50 mils (1270 microns). In one embodiment, the depth is in a range of from about 1 mil (25 microns) to about 30 mils (762 microns), and in another embodiment the depth is in a range of from about 3 mils (76 microns) to about 20 mils (508 microns). The width of the lines may also differ from embodiment to embodiment. An example of a useful range for width is from about 0.5 mil (12.5 microns) to about 250 mils (63.5 microns), in one embodiment the width is in a range of from about 2.5 mils (63.5 microns) to about 125 mils (6350 microns), and in another embodiment the width is in a range of from about 5 mils (127 microns) to about 75 mils (1905 microns).

In one embodiment of the invention, the recesses formed in the surface of the facestock layer are at least partially filled, and in one embodiment, substantially filled with an elastomeric foam. The elastomeric foam may comprise a resin, which upon drying, cooling and/or curing is foamed to at least partially fill the pattern of recesses in the facestock film. The elastomeric foam resin may be printed on and then embedded into the facestock film. Alternatively, the recesses may be formed in the facestock film, and subsequently filled with the elastomeric foam material. An adhesive layer can then be applied to the facestock film. Upon the application of pressure to the adhesive article, the elastomeric foam compresses, creating a path for egress for the air trapped between the adhesive layer and the substrate to which the adhesive article is applied.

The adhesive articles also comprise a continuous adhesive layer having a first surface and a second surface wherein the first surface of the adhesive is adhered to the second surface of the facestock film. The adhesive layer may have a thickness from about 10 to about 125, or from about 25 to about 75, or from about 10 to about 50 microns. In one embodiment, the coat weight of the pressure sensitive adhesive is in the range of about 10 to about 50 grams per square meter (gsm), and in one embodiment about 20 to about 35 gsm.

The pressure sensitive adhesive can be any suitable adhesive including pressure-sensitive adhesives (PSAs) and heat activated adhesives. Useful PSAs include rubber based adhesives, acrylic adhesives, vinyl ether adhesives, silicone adhesives, and mixtures of two or more thereof. Also included are the pressure sensitive adhesive materials described in *Adhesion and Bonding*, Encyclopedia of Polymer Science and Engineering, Vol. 1, pages 476-546, Interscience Publishers, 2nd Ed. 1985, the disclosure of which is hereby incorporated by reference. Some of the above-referenced suitable pressure sensitive adhesive materials contain as a major constituent resin-based material such as acrylic type polymers, block copolymers, natural, reclaimed or styrene butadiene rubbers, tackified natural or synthetic rubbers, random copolymers of ethylene and vinyl acetate, ethylene-vinyl-acrylic terpolymers, polyisobutylene, poly(vinyl ether), and the like. Particularly useful pressure sensitive adhesive materials are typically characterized in that they have a glass transition temperature of from about −70° C. to about 10° C.

Other materials in addition to the foregoing resins may be included in the pressure sensitive adhesives. These include solid tackifying resins, liquid tackifiers (also referred to as plasticizers), antioxidants, fillers, pigments, waxes, etc. The adhesive materials may contain a blend of solid tackifying resins and liquid tackifying resins (or liquid plasticizers). Particularly useful additives are described in U.S. Pat. Nos. 5,192,612 and 5,346,766, which are incorporated herein by reference.

Useful techniques for applying the continuous adhesive layer to the second surface of the facestock include curtain coating, gravure coating, reverse gravure coating, offset gravure coating, roller coating, brushing, knife-over roll coating, metering rod coating, reverse roll coating, doctor knife coating, dipping, die coating, spraying, and other similar methods. In one embodiment, the adhesive is applied to the facestock film by laminating an adhesive layer that is removably adhered to a release liner or carrier layer. The adhesive layer is applied so that the adhesive layer bridges the recesses present in the second surface of the facestock.

In one embodiment, the adhesive articles of the invention also comprise a release liner. Release liners useful in the present invention include those known in the art. In one embodiment, useful release liners include polyethylene coated papers with a silicone release coating, polyethylene coated terephthalate films with a silicone release coating, or cast polypropylene films that can be embossed with a pattern or patterns while making such films, and thereafter coated with a silicone release coating. The release liner may be selected for its release characteristics relative to the pressure sensitive adhesive chosen for use in the present invention. In one embodiment, the surface of the release liner may have a textured finish, a smooth finish, or a patterned finish. The release layer may have a randomly microstructured surface such as a matte finish, or have a pattern of three-dimensional microstructures. The microstructures may have a cross-section which is made up of circles, ovals, diamonds, squares, rectangles, triangles, polygons, lines or irregular shapes, when the cross-section is taken parallel to the surface of the release surface.

In one embodiment, the second surface of the adhesive layer of the articles of the invention has a Sheffield roughness of at least about 10, or at least about 75, or at least about 150. The second surface of the adhesive layer may itself have the indicated roughness, or the rough surface may be formed when the adhesive is coated onto a release liner. It is understood that the surface of the release liner may have a Sheffield roughness at least about 10 or at least about 50, or at least about 75 or at least about 150. The adhesive will replicate the complementary texture or pattern of the release liner. Alternatively, the release liner can be rougher depending on the configuration of the adhesive article. The Sheffield roughness is determined by TAPPI T 538 om-88.

In one embodiment of the present invention, an adhesive article comprising a facestock layer having a pattern of recesses forming a channel of interconnecting diamonds on a second surface, and an adhesive layer adhered to the second surface of the facestock is formed. When the adhesive article is adhered to a substrate, an air bubble may form between the adhesive layer and the substrate. To remove the air bubble, the facestock over the bubble is lightly pressed increasing the pressure inside the air bubble, which in turn causes the adhesive to dome up into the diamond patterned channel of the facestock and to fully or partially fill with adhesive. The air that is displaced by the adhesive is exhausted through the channel to an outside edge. The channel pattern is formed so that as the channel collapses, a complementary pattern at the interface between the adhesive layer and the substrate is formed.

The resulting complementary pattern provides a path of weakness in the adhesive/substrate interface by which the air trapped between the adhesive and the substrate can be exhausted. When the adhesive article is applied to a substrate, air trapped between the adhesive and the substrate follows the path of least resistance, which is the complementary pattern formed at the interface.

With even modest application pressure, the combination of geometric contact area between the pressure sensitive adhesive and the viscoelastic properties of the pressure sensitive adhesive allows the adhesive to debond readily from the substrate at the weakened areas of the adhesive layer. Increased pressure applied to the air entrapped between the substrate and the pressure sensitive adhesive easily forces the pressure sensitive adhesive to deform into the channel above, allowing air to escape through the pattern of weakness in the adhesive to an outside edge. Air in the channel above is simultaneously exhausted to the edge. Adhesive articles of the present invention exhibit substantially increased air egress in comparison to those of standard adhesive articles.

The adhesive articles according to the present invention may include additional or multiple layers in addition to the facestock and the adhesive layer. For example, a primer layer can be employed between the adhesive layer and the facestock layer; a coating layer and/or a printing or ink layer can be employed over an outer surface of the facestock layer.

In one embodiment, the recesses in the facestock surface do not form channels or egress routes leading to an end edge of the adhesive article 100. The adhesive layer 104 can still flex, compress and/or collapse into a defined cavity to trap bubbles at the interface between the adhesive layer and the substrate in a predetermined pattern. The presence of the bubbles modifies the contact area, generally reducing it. That is, a portion of the adhesive layer second surface contacts the substrate surface, and another portion, which is lifted away from the substrate surface by the trapped bubbles, does not contact the substrate surface. The modified contact area can provide repositionability and/or slideability of the adhesive article, as well as a measure of air egress. Once the adhesive article is properly positioned in a desired location and orientation, the facestock surface can be brushed or swept to move the trapped bubbles from beneath the adhesive article and thus increase the contact area between the adhesive layer and the substrate surface.

Figure 6:
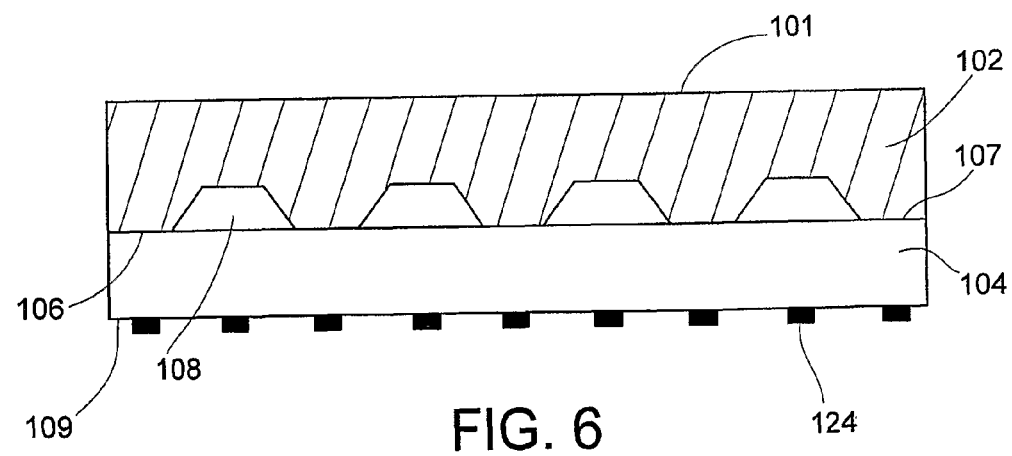
FIG. 6 is a cross-sectional view of an adhesive article of the present invention including non-adhesive material forms on the surface of the adhesive layer.

In yet another embodiment of the invention illustrated in FIG. 6, the adhesive articles of the invention comprise a facestock film 102 having a first surface 101, a second surface 106 having a plurality of recesses 108, and end edges 110; an adhesive layer 104 having a first surface 107 and a second surface 109 wherein the first surface 107 of the adhesive layer 104 is adhered to the second surface 106 of the facestock film 106; and non-adhesive material forms 124 in adhesive contact with the second surface of the adhesive layer 104. The non-adhesive material forms 124 may provide additional means for fluid egress and/or provide repositionability and/or slideabilty to the adhesive article.

Figure 7:
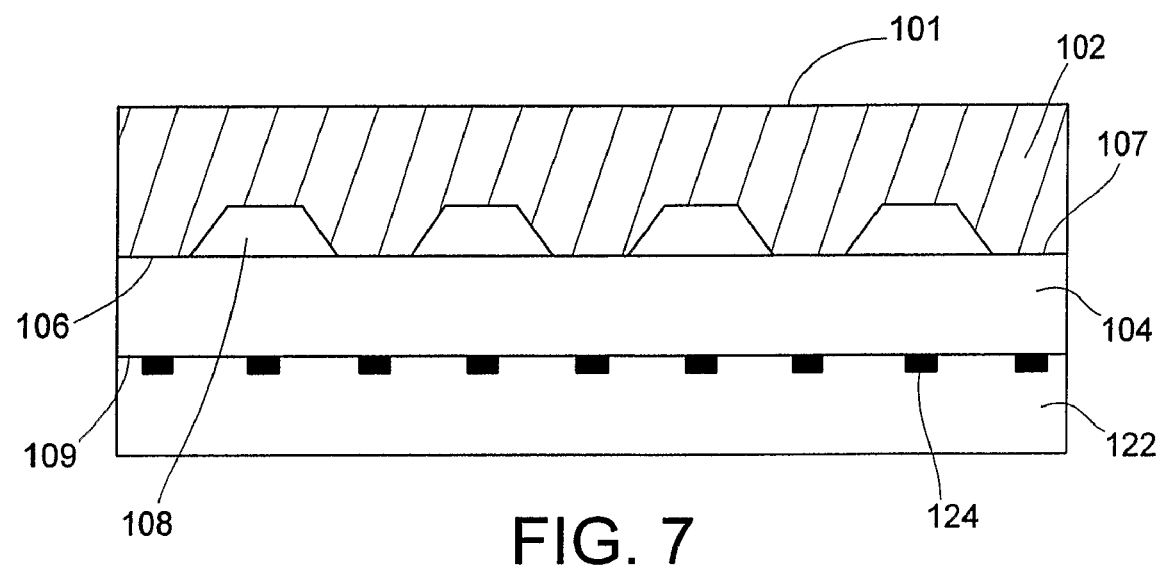
FIG. 7 is a cross-sectional view of an adhesive article of the invention including a release liner having non-adhesive material forms embedded therein.

In another embodiment illustrated in FIG. 7, an adhesive article is illustrated which is similar to the adhesive article illustrated in FIG. 6 with the addition of release liner 122. In this embodiment, the non-adhesive material forms 124 are embedded in the release liner 122. Upon removal of the release liner 122, the non-adhesive material forms 124 are adhered to the second surface 109 of the adhesive layer 104 as shown in FIG. 6.

In one embodiment, the adhesive article illustrated in FIG. 7 can be prepared by printing a pattern of non-adhesive material on the release surface of a release liner having a moldable layer under the release surface, and thereafter passing the printed release liner through laminating rollers to press the non-adhesive material into the release liner. After the non-adhesive material is embedded into the release liner, the release liner is coated with an adhesive layer. A facestock having a plurality of recesses is brought into contact with the adhesive layer which bridges the recesses as shown.

The non-adhesive material forms shown in FIGS. 6 and 7 may comprise non-adhesive polymers, including ink compositions applied by printing methods. In another embodiment, the non-adhesive material is applied by vacuum metalization or by sputtering. The non-adhesive material, after drying, cooling, and/or curing, releasably adheres to the upper surface of the release liner. In one embodiment, the non-adhesive composition contains greater than 50%, or greater than 75%, or greater than 85% solids. In another embodiment, the non-adhesive composition is 100% solids.

In one embodiment, the non-adhesive material can be any material that can be used as the ink on a printing machine, provided that upon drying, cooling, and/or curing, the non-adhesive material is not tacky. The non-adhesive material may be made of organic polymeric material such as polyurethane, polyvinyl chloride, acrylic polymers, acetate, polyethylene, polypropylene or polystyrene and the like.

In one embodiment, the non-adhesive composition is a UV curable ink. The ultraviolet radiation curable inks useful in the invention generally comprise a binder which comprises one or more photopolymerizable monomers. The photopolymerizable monomers generally are ethylenically unsaturated compounds. The unsaturated compounds may contain one or more olefinic double bonds, and they may be low molecular weight compounds, (monomeric) or high molecular weight compounds (oligomeric). Illustrative examples of monomers containing one double bond are acrylates such as alkyl(meth) acrylates or hydroxyalkyl(meth)acrylates such as methyl-, ethyl-, butyl-, 2-ethylhexyl- or 2-hydroxyethylacrylate, isobornylacrylate, methyl- or ethylmethacrylate. Further examples of photopolymerizable monomers are acrylonitrile, acrylamide, methacrylamide, N-substituted (meth) acrylamides, vinyl esters such as vinyl acetate, vinyl ethers such as isobutylvinyl ether, styrene, alkylstyrenes and halostyrenes, N-vinylpyrrolidone, vinyl chloride or vinylidene chloride.

Monomers containing a plurality of double bonds are typically the diacrylates of ethylene glycol, 1,3-propylene glycol, 1,4-butaneodiol, 1,4-cyclohexane diol, neopentyl glycol, hexamethylene glycol, or bisphenol A polyacrylates such as trimethylolpropane triacrylate and pentaerythritol triacrylate or tetraacrylate, vinyl acrylate, divinyl benzene, divinyl succinate, diallyl phthalate, triallylphosphate, triallylisocyanurate or tris(2-acryloyloxy)ethyl-isocyanurate.

Typical examples of high molecular weight (oligomeric) polyunsaturated compounds are acrylated epoxy resins, acrylated polyethers, acrylated polyurethanes or acrylated polyesters. Further examples of unsaturated oligomers are unsaturated polyester resins which are normally prepared from maleic acid, phthalic acid and one or more diols and which have molecular weights of about 500 to about 3000. Such unsaturated oligomers may also be referred to as prepolymers. Single component systems based on photocurable prepolymers are often used as binders for printing inks. Unsaturated polyester resins are normally used in two-component systems together with a monounsaturated monomer such as described above, preferably with styrene.

The unsaturated compounds also can be used in admixture with non-photopolymerisable film-forming components. These components may typically be drying polymers or their solutions in organic solvents, such as nitrocellulose. They may also, however, be chemically curable or thermocurable resins such as polyisocyanates, polyepoxides or melamine resins. The concomitant use of thermocurable resins is important for use in so-called hybrid systems which are photopolymerised in a first step and crosslinked by a thermal after treatment in a second step.

The UV radiation curable inks also may contain at least one photoinitiator. A wide range of different photoinitiators is at present available for UV radiation curable systems. They include benzophenone and benzophenone derivatives, benzoin ethers, benzil ketals, dialkoxyacetophenones, hydroxyacetophenones, aminoacetophenones, haloacetophenones or acryloxyphosphine oxides. They differ in that they have different absorption maxima. To cover a wide absorption range it is possible to use a mixture of two or more photoinitiators. The total amount of photoinitiator in the UV radiation curable compositions may be in the range of from about 0.05 to about 7, or 10% by weight of the total composition. Preferably the compositions contain from about 0.2% to about 5% by weight of the photoinitiator.

Amines may be added to accelerate the photopolymerisation, for example triethanolamine, N-methyl-diethanolamine, p-dimethylaminobenzoate or Michler's ketone. The photopolymerisation can further be accelerated by the addition of photosensitisers which displace or broaden the spectral sensitivity. These photosensitisers are preferably aromatic carbonyl compounds such as thioxanthone, anthraquinone and 3-acyl-coumarin derivatives as well as 3-(aroylmethylene)-thiazolines.

Hindered amine light stabilizers (HALS) which function as co-stabilizers, also may be added to the UV radiation curable printing compositions used in the present invention.

Examples of hindered amine light stabilizers include those listed and recited in U.S. Pat. Nos. 5,112,890 and 4,636,408, which are incorporated herein by reference. A specific example of a hinder amine light stabilizer useful in the printing inks is Tinuvin 292 which is identified as bis(1,2,2,6,6-pentamethyl-4-piperidinyl) sebacate.

In addition to the above described binder materials and photoinitiators, the UV radiation curable inks used in the present invention to form the non-adhesive material forms may also contain coloring matter selected from organic pigments, inorganic pigments, body pigments and dyes which are known and have been used in this art. Examples of useful pigments include titanium dioxide, cadmium yellow, cadmium red, cadmium maroon, black iron oxide, carbon black, chrome green, gold, silver, aluminum and copper. Examples of dyes include alizarine red, Prussian blue, auramin naphthol, malachite green, etc. Generally the concentration of the pigment or dye in the ink will be from about 0 to about 70% by weight, and in one embodiment, from about 0.1% to about 50% by weight.

In addition to the above described coloring matter, the UV radiation curable inks used in the present invention to form the non-adhesive material forms may also contain fillers, extenders, surfactants, and the like which are known and have been used in this art. Examples of useful fillers and extenders include silicon dioxide, fumed silica, glass or ceramic microspheres, and glass or ceramic bubbles. Generally the concentration of the filler or extender will be from about 0 to about 70% by weight, and in one embodiment, from about 0.5% to about 50% by weight.

The printing inks may also contain at least one UV absorber which provides weathering protection and helps prevent microcracking. The amount of UV absorber included in the UV radiation curable ink should be maintained at a practical minimum since the presence of the UV absorber may increase the curing rate. A variety of UV absorbers are known and useful in the present invention and these include UV absorbers belonging to the group of photopolymerisable hydroxybenzophenones and photopolymerisable benzotriazoles. U.S. Pat. No. 5,369,140 describes a class of 2-hydroxyphenyl-s-triazines that are useful as UV absorbers for radiation curable systems. The triazines are effective for stabilizing cured films when exposed to sunlight over a long period of time, and these stabilizers do not interfere with UV radiation curing of the inks. The triazine UV absorbers are effective in amounts of from about 0.1 to about 2% by weight. The UV absorbers may be used in combination with other light stabilizers such as sterically hindered amines. The disclosure of the '140 patent is hereby incorporated by reference for its disclosure of such UV absorber combinations. U.S. Pat. Nos. 5,559,163 and 5,162,390 also describe UV absorbers which are useful in the inks of the present invention.

Examples of useful UV curable inks include those available from Decochem under the trade designation Poly-Rad plastics, as well as UV curable inks commercially available from Acheson and Daw Chemical Company.

The UV curable inks may be applied to the second surface of the adhesive layer or to the release surface of a release liner. If applied to a release surface, the ink is pressed into the release surface before the release liner is brought into content with the second surface of the adhesive layer.

In one embodiment of the invention, the ink used to form the non-adhesive material forms is a coalescing ink. The ink does not efficiently wet out on the surface of the release liner, but coalesces into smaller areas of ink with an increase in height. Thus, depending on the degree of coalescence, a line of printed ink can form a narrower line, or a line made up of what appear to be random small beads of ink, or a combination, all with an increase in height. The narrower line, small beads, or combination are then embedded into the liner. The thickness of the ink applied to the surface of the release liner can also affect the degree of coalescence. Surfactants may be added to the ink composition to control the degree of coalescence as well.

In one embodiment of the invention, the ink used to form the non-adhesive material forms comprises a porous non-adhesive. The porous non-adhesive may have elastomeric properties, so that if it is compressed, it essentially returns to its original shape. For example the porous non-adhesive comprises an ink containing a blowing agent that causes the ink to expand, forming an open or closed cell, or combination thereof. The blowing agent is activated, for example, by the application of heat to the ink. Other examples of porous non-adhesives include suspensions of gas and/or particles in a binder. The porous non-adhesive is then embedded into the release liner. The porous non-adhesive fills the depression created in the embedding step, resulting in a facestock layer having a smooth outer appearance.

The non-adhesive material forms are generally present in a pattern. The pattern can be a plurality of dots, lines, or any geometric figure, that provides a path for air egress repositionability and/or slideability. When lines are used, at least about 50% of the pattern should extend to the edge of the adhesive article to obtain acceptable air egress. The lines and other patterns generally have an average thickness from about 0.3 microns to about 100 microns, or from about 0.5 microns to about 50 microns, or from about 2 microns to about 20 microns. The width of the lines may also vary widely. An example of a useful range for line width is from about 12 microns to about 250 microns, or from about 25 microns to about 125 microns, or from about 50 microns to about 75 microns. The pattern may be a grid of intersecting lines, a weave pattern, a waffle pattern, diagonal straight and curved lines, tiled geometric figures, such as hexagons, rectangles, overlapping circles or triangles, or lines in a cross hatch pattern. Combinations of patterns may be used such as a grid of intersecting lines with random or patterned dots. The non-adhesive material forms may be applied by any means.

In one embodiment, the non-adhesive material is a polymer composition which is able to be printed by any suitable printing technique such as screen printing, roller coat printing, flexographic printing, lithographic printing, gravure printing, laser printing, ink jet printing, brushing, spraying, dipping or coating. The type of printing may be any type which can print on the release liner. One particularly useful printing method is a modification of flexographic printing which provides both the printing and embedding of the non-adhesive material.

In one embodiment, the non-adhesive material forms comprise a printing ink having a thickness from about 0.3 to about 100 microns, from about 0.5 to about 50 microns, or from about 2 to about 20 microns. The non-adhesive material forms may also be applied by means of patterned vacuum metallization or sputtering. In this embodiment, the non-adhesive material forms typically have a thickness from about 30 to about 3000, from about 100 to about 2000, or from about 300 to about 1500 nanometers.

The processes and embodiments described herein are examples of structures, systems and methods having elements corresponding to the elements of the invention recited in the claims. This written description may enable those skilled in the art to make and use embodiments having alternative elements that likewise correspond to the elements of the invention recited in the claims. The intended scope of the invention thus includes other structures, systems and methods that do not differ from the literal language of the claims, and further includes other structures, systems and methods with insubstantial differences from the literal language of the claims.

What is claimed is:

1. An adhesive article comprising:
   a facestock film having a first surface, a second surface and end edges;
   a release liner; and
   a continuous layer of adhesive having a thickness ranging from about 10 to about 125 microns and a coat weight of about 10 to about 50 grams per square meter and having a first surface and a second surface, wherein the first surface of the adhesive layer is adhered to the second surface of the facestock film,
   the release liner having a release surface releasably adhered to the second surface of the adhesive layer,
   wherein the second surface of the facestock film has a plurality of recesses having a depth ranging from about 1 mil to about 30 mils and a width ranging from about 0.5 mils to about 250 mils that are free of adhesive and form a path to at least one end edge of the facestock film that provide a path for fluid egress, and
   upon application of the adhesive article to a surface of a substrate, the adhesive layer is capable of filling the plurality of recesses thereby creating a complementary path for air egress at an interface between the adhesive layer and the surface of the substrate.

2. The adhesive article of claim 1 wherein the plurality of recesses form a pattern.

3. The adhesive article of claim 2 wherein the pattern comprises a plurality of parallel lines.

4. The adhesive article of claim 2 wherein the pattern comprises a plurality of intersecting lines.

5. The adhesive article of claim 2 wherein the pattern comprises a plurality of interconnected shapes.

6. The adhesive article of claim 1 wherein the recesses are at least partially filled with a compressible foam.

7. The adhesive article of claim 1 wherein the facestock film comprises a multilayer film.

8. The adhesive article of claim 1 wherein the facestock film comprises a decorative wall covering or a graphic film.

9. The adhesive article of claim 1 wherein the adhesive layer comprises a pressure sensitive adhesive or a heat activated adhesive.

10. The adhesive article of claim 1 wherein the facestock film has a thickness of about 0.0127 mm to about 0.254 mm.

11. The adhesive article of claim 1 further comprising a print layer disposed on the first surface of the facestock film.

12. The adhesive article of claim 11 wherein the print layer comprises a radiation curable ink.

13. The adhesive article of claim 1 wherein the release surface of the release liner has a textured surface.

14. The adhesive article of claim 1 wherein the release liner has non-adhesive material forms adhered to or embedded into the release surface.

15. The adhesive article of claim 1 wherein the recesses are formed by embossing the second surface of the facestock.

16. The adhesive article of claim 1 wherein the recesses are formed by imprinting protrusions on the second surface of the facestock which delineate recesses on the second surface of the facestock.

* * * * *